United States Patent
Zhao et al.

(10) Patent No.: US 9,507,798 B1
(45) Date of Patent: Nov. 29, 2016

(54) CENTRALIZED LOGGING FOR A DATA STORAGE SYSTEM

(71) Applicant: EMC Corporation, Hopkinton, MA (US)

(72) Inventors: Bingfeng Zhao, Beijing (CN); Jun Chen, Framingham, MA (US); Stephen M. Lathrop, Milford, MA (US); Wai Chuen Yim, Merrimack, NH (US); Yongmei Xie, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 367 days.

(21) Appl. No.: 14/143,993

(22) Filed: Dec. 30, 2013

(51) Int. Cl.
*G06F 17/30* (2006.01)

(52) U.S. Cl.
CPC .............. *G06F 17/30194* (2013.01)

(58) Field of Classification Search
CPC ................................................ G06F 17/30194
See application file for complete search history.

(56) References Cited

U.S. PATENT DOCUMENTS

| | | | |
|---|---|---|---|
| 5,892,898 A | 4/1999 | Fujii et al. | |
| 6,135,777 A | 10/2000 | Vogel | |
| 6,996,580 B2 | 2/2006 | Bae et al. | |
| 8,719,452 B1 * | 5/2014 | Ding | H04N 21/4344 709/248 |
| 2006/0218273 A1 * | 9/2006 | Melvin | H04L 63/102 709/224 |
| 2013/0179821 A1 * | 7/2013 | Bauer | G11C 7/1072 715/772 |
| 2013/0304694 A1 * | 11/2013 | Barreto | G06F 17/30283 707/608 |

OTHER PUBLICATIONS

Jones, Anatomy of Linux journaling file systems, Jun. 4, 2008, pp. 1-8.*
IBM, Normalizing Timestamps to Enable Multiple Log File Aggregation with Proper Event Ordering, IP.com Prior Art Database Technical Disclosure No. IPCOM000132999D, Jan. 9, 2006, pp. 1-4.*

* cited by examiner

*Primary Examiner* — Albert Phillips, III
(74) *Attorney, Agent, or Firm* — BainwoodHuang (57) ABSTRACT

A technique for logging events in a data storage system involves designating one subset of storage processors of the data storage system as clients that generate log entries and another subset of the storage processors as servers that receive log entries. Only one server is active at a time. The active server receives the generated log entries from the clients and persists the log entries to a centralized log store. Clients assign first timestamps to the log entries based on locally accessible clocks. The active server receives the log entries, including the first timestamps, from the clients and applies second timestamps based on a clock accessible to the server. As the second timestamps are consistent across the different clients, the second timestamps can be applied to correct misalignments in time among the log entries received from the clients.

19 Claims, 4 Drawing Sheets

CENTRALIZED LOGGING FOR A DATA STORAGE SYSTEM

BACKGROUND

Data storage systems typically contain multiple storage processors for handling large volumes of data access requests from host computers. For example, users of host computers may wish to access data for reading or writing various disks or other storage media of a data storage system. The storage processors may receive and process hundreds or even thousands of storage requests per minute.

The storage processors of such data storage systems generate log histories based on events. Events that are logged by storage processors may include receipt and completion of storage requests from hosts, connection or disconnection of devices connected to storage processors, and the installation or deletion of software, for example.

In conventional data storage systems, each storage processor is configured with both a logging system client and a logging system server. Each logging system client generates log entries in response to events that occur on the storage processor on which it is run and sends the log entries to a logging system server. The logging system server receives the log entries and writes them to persistent storage (e.g., RAID protected disks and/or flash drives). Each processing node that runs a logging client is configured to apply a timestamp to each log entry it generates.

SUMMARY

Unfortunately, there are deficiencies with the above-described conventional logging systems. For example, storage processors are often in high demand servicing read and write request from hosts and are completely utilized, or nearly so. Configuring storage processors with both logging clients and logging servers places unnecessary burdens on those storage processors, especially when each storage processor is required to run only a logging client or a logging server, but not both. Such burdens can impair performance.

Also, logging clients conventionally apply timestamps to log entries based on clocks within respective storage processors, but the clocks may reset unpredictably and/or may diverge from one another. It can thus be difficult to identify relationships among log entries originating from different storage processors in a data storage system because the times as reported in the log entries may not align and because alignment may change over time.

In contrast with the above-described conventional data storage systems in which processing nodes are heavily burdened because they may run both logging clients and logging servers, an improved technique involves designating one subset of storage processors of the data storage system as clients that generate log entries and another subset of the storage processors as servers that receive log entries. Only one server is active at a time. The active server receives the generated log entries from the clients and persists the log entries to a centralized log store. Clients assign first timestamps to the log entries based on locally accessible clocks. The active server receives the log entries, including the first timestamps, from the clients and applies second timestamps based on a clock accessible to the server. As the second timestamps are consistent across the different clients, the second timestamps can be applied to correct misalignments in time among the log entries received from the clients.

Advantageously, the improved technique provides improvements in critical performance by reclaiming wasted resources for use in processing storage requests. Also, providing two timestamps to log entries allows log entries originating from different storage processors to be aligned with one another and thus affords a better understanding of activities occurring across multiple storage processors of a data storage system.

One embodiment of the improved technique is directed to a method of logging events in a data storage system. The method includes running a logging server on a storage processor of the data storage system. The method also includes receiving, by the logging server, log entries from multiple logging clients running on respective other storage processors of the data storage system, each log entry generated by one of the logging clients in response to an event occurring on the storage processor on which the logging client runs and including a first timestamp referenced to a clock on the storage processor on which the logging client runs. The method further includes applying, by the logging server, a second timestamp to each of the log entries received from the logging clients, each second timestamp referenced to a common clock accessible to the storage processor on which the logging server runs. The method further includes persistently storing, by the logging server, the log entries including the respective first and second timestamps to a centralized log store.

Additionally, some embodiments of the improved technique are directed to an apparatus constructed and arranged to log events in a data storage system. The apparatus includes memory and a set of processors coupled to the memory to form controlling circuitry. The controlling circuitry is constructed and arranged to carry out a method of logging events in a data storage system.

Furthermore, some embodiments of the improved technique are directed to a computer program product having a non-transitory computer-readable storage medium which stores code including a set of instructions which, when executed by a data storage system, cause the data storage system to carry out a method of logging events in a data storage system.

In some arrangements, each first timestamp is indicative of a time at which the respective event occurred, and each second timestamp is indicative of a time at which the logging server received the respective log entry. Persistently storing each received log entry includes placing the log entries into a log file stored in the centralized log store, the log entries being placed in the order in which the logging server receives the log entries.

In some arrangements, the method further includes resequencing the log entries in the log file based on the first timestamps and the second timestamps in an attempt to place the log entries in the order in which the respective events occurred.

In some arrangements, the method further includes running a logging gateway on a storage processor of the data storage system, the logging gateway presenting a logging server interface to a set of the logging clients and presenting a logging client interface to the logging server. Receiving log entries from the logging clients includes obtaining at least some of the log entries from the logging gateway, the logging gateway having received such log entries from at least some of the logging clients.

In some arrangements, log entries are generated in a first data format by application programs running on the storage processors on which the logging clients run. The method further includes, after receiving the log entries and prior to adding the second timestamps, translating the log entries from the first data format to a second data format.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

An improved technique for logging events in a data storage system involves designating one subset of storage processors of the data storage system as clients that generate log entries and another subset of the storage processors as servers that receive log entries. Only one server is active at a time. The active server receives the generated log entries from the clients and persists the log entries to a centralized log store.

Figure 1:
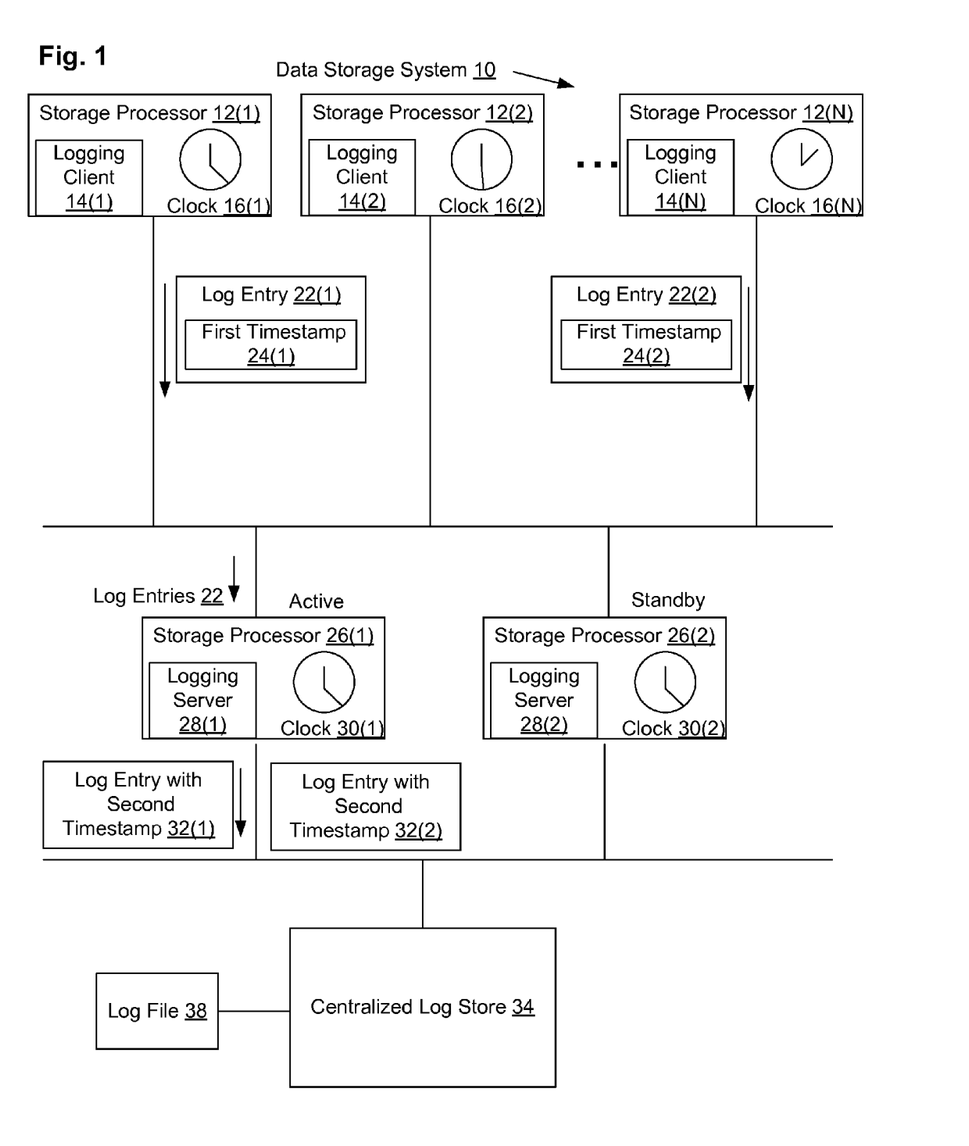
FIG. 1 is a block diagram illustrating an example data storage system in which the improved technique may be carried out.

FIG. 1 illustrates an example data storage system 10 in which the improved technique can be carried out. Data storage system 10 includes storage processors 12(1), 12(2), ..., 12(N), where N is the number of storage processors that are configured to run logging clients only. Data storage system 10 also includes storage processor 18, which is configured to run as a logging gateway. Data storage system 10 further includes storage processors 26(1) and 26(2), each of which has a logging server installed thereon, although logging server on the storage processor 26(1) is initially active while the logging server on the storage processor 26(2) is initially inactive. Data storage system 10 further includes centralized log store 34.

Storage processors 12(1), 12(2), ..., 12(N) are configured to run lightweight clients and are not configured to be set up as logging servers (e.g., no logging server software is installed or run on them). Advantageously, such processors can devote full processing power to processing access requests, for example. Storage processors 12(1), 12(2), ..., 12(N) each include respective logging client software 14(1), 14(2), ..., 14(N), as well as local clocks 16(1), 16(2), ..., 16(N).

Logging client software 14(1), 14(2), ..., 14(N) is configured to cause respective storage processors, say 12(1) and 12(N), to generate log entries 22(1) and 22(2) in response to events occurring at storage processors 12(1) and 12(N). Log entries 22(1) and 22(2) each have respective local timestamps 24(1) and 24(2) that indicate the time that the respective storage processor 12(1) or 12(N) responded to an event occurring at that storage processor. Logging client software 14(1), 14(2), ..., 14(N) is further configured to cause storage processors 12(1) and 12(N) to send generated log entries 22(1) and 22(2) to a logging server.

Local clocks 16(1), 16(2), ..., 16(N) each track time independently. In some examples, the local clocks 16(1), 16(2), ..., 16(N) each track time according to a network time protocol (NTP) by which each of local clocks 16(1), 16(2), ..., 16(N) can synchronize to an external time reference. It may be the case that a local clock, say, 16(1), has been reset according to its respective time reference—so that the timestamps based on local clock 16(1) are non-monotonic—while the other local clocks 16(2), ..., 16(N) produce monotonic timestamps.

Log entries 22(1) and 22(2) (log entries 22) each contain a descriptor of an event (i.e., a data access request from a host) and a respective local timestamp 24(1) and 24(2). In some arrangements, the data contained within log entries 22 is written in a compact binary format. This way, log entries 22 are very lightweight and do not require much storage.

Storage processors 26(1) and 26(2) are configured to run respective logging servers 28(1) and 28(2), and contain respective server clocks 30(1) and 30(2). In the event of failover from the logging server 28(1) to the standby server 28(2), all second timestamps are relative to clock 30(2) and thus stay together to maintain alignment among different client clocks. Only one of these storage processors 26(1) and 26(2) may be actively running a logging server at one time, with the server on the other remaining inactive or not running at all. For example, the other storage processor, say, 26(2), runs standby logging server 28(2) that is available in case storage processor 26(1) fails or has connections interrupted.

In some arrangements, there is a procedure for failover in case logging server 28(1) fails due to, e.g., loss of connection to logging clients 14. In this procedure, logging clients 14 queue log entries 22 in local cache. Stanbdby server 28(2) then becomes the active server 28(1) as it sends instructions to clients 14 to send log entries 22 queued in respective local caches and future log entries to stanbdby server 28(2) until further notice. Standby server 28(2), now the active server, receives log entries from logging clients 14 and, as discussed below, stores log entries in centralized log store 34.

Logging server 28(1) (as well as standby 28(2)) is configured to receive log entries 22 from storage processor 12 and, upon receipt, to store output log entries 32(1) and 32(2) derived from respective log entries 22(1) and 22(2) in a log file 38 within centralized log store 34. Logging server 28(1) is also configured to insert a second timestamp into log entries 32(1) and 32(2) according to when the server clock 30(1) determines log entries 22 were received by storage processor 26(1). In some arrangements, logging server 26(1) is configured to read log entries 22(1) and 22(2) in the compact binary format and translate the data in that format into a human-readable, textual format such as XML or some other markup language, or even plain text, for provision in the log entries 32(1) and 32(2).

It should be understood that an advantage of the logging server 28(1) inserting the second timestamp into the log entries 32(1) and 32(2) is to more accurately align events occurring at the storage processors 12(1), etc., which run logging clients. This way, patterns of behavior can be determined more readily than if only a single timestamp were provided.

Centralized log store 34 is configured to store log entries received from storage processor 26(1) or 26(2) in a single log file 38. Centralized log store 34 thus serves as a centralized repository for all log entries generated within data storage system 10. An advantage of using such a repository is that it makes possible the rapid sequencing of events, as well as making the storage of log events more reliable, as log entries persisted in the centralized log store 34 are typically RAID protected and may also be protected by various backup and replication schemes, which are not readily available within storage processors themselves.

In an example, log file 36 is a text file into which log entry textual data are written and arranged sequentially in the order the log entries are received by the active server. An analyst may examine log file 36 in an attempt to reconstruct sequences of events occurring across multiple storage processors running logging clients, and the accuracy of the analyst's work may be improved significantly by the inclusion of two sets of timestamps.

During example operation, a storage processor, say 12(1), receives a data access request from an external host. For example, a user on the external host sends a copy command to storage processor 12(1) directing the storage processor 12(1) to copy a file stored in the data storage system 10 (e.g., in the centralized log store 34).

This data access request defines an event for which logging client 14(1) causes storage processor 12(1) to generate log entry 22(1). Because of the high volume of events such as data access requests being received by storage processor 12(1), logging client 14(1) causes storage processor 12(1) to render log entry 22(1) in a compact binary format in order to save memory and bandwidth.

It should be understood that log entry 22(1) contains information about the data access request in the form of values of parameters, such as IP address of requesting host, filename of file, command descriptor, and time received by storage processor 12(1), for example. The time received is reflected in local timestamp 24(1).

After log entry 22(1) is generated, storage processor 12(1) sends log entry 22(1) to storage processor 18 which runs gateway 20. In some arrangements, storage processor 18 and storage processor 12(1) are connected via a high speed backplane or bus.

Once storage processor 18 receives log entry 22(1), storage processor 18 and sends log entry 22(1) to storage processor 26(1). In some arrangements, because of high volumes of log entries being sent within data storage system 10, as well other system traffic, storage processor 18 may temporarily store log entry 22(1) in a local cache before sending.

Once storage processor 26(1) receives log entry 22(1), logging server 28(1) translates the data of log entry 22(1) from the compact binary format into a textual-based, human-readable format, such as XML. For example, logging server 28(1) includes a component that accesses the data of the log entry 22(1) in the compact binary format and writes the data in the textual-based, human-readable format (e.g., XML) to a new log entry 32(1).

Logging server 28(1) also contains instructions to include in the log entry 32(1) a second timestamp indicating the time at which log entry 22(1) was received at storage processor 26(1) according to server clock 30(1).

Once the logging server 28(1) has prepared the log entry 32(1), the logging server 28(1) directs other constructs running on the storage processor 26(1) to persistently store log entry 32(1) in centralized log store 34. For example, storage processor 26(1) sends a write command to centralized log store 34 containing log entry 32(1). Centralized log store 34 then stores log entry 32(1) in log file 38 of database 36 via a database command.

It should be understood that the text of log entry 32(1) is stored in log file 38 according to the order in which centralized log store 38 receives the write command. In a post-processing step, however, either a processor such as storage processor 26(1) or a human analyst may rearrange the order of the text entries of log file 38 according to the local timestamp 24, the second timestamp, or both. The advantage of using the second timestamp would be to understand issues such as delay within data storage system 10 and correlation between clocks 16(1), etc. so that a global picture of events in the data storage system 10 are better understood.

Figure 2:
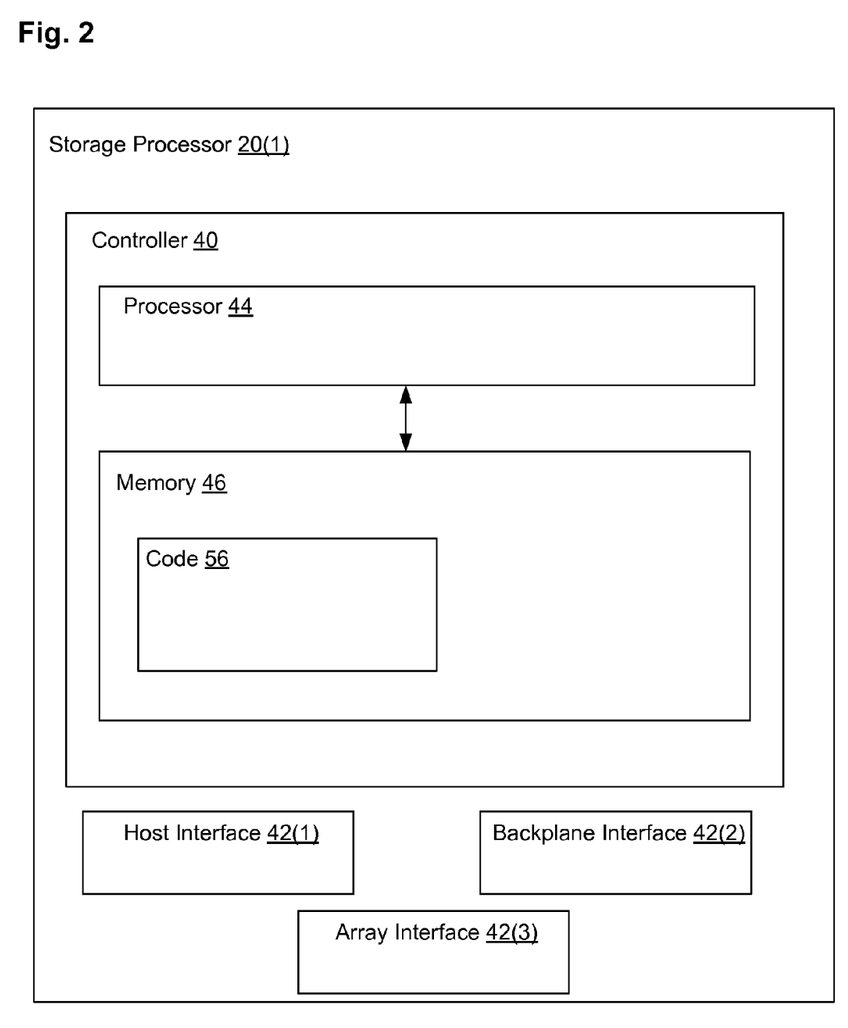
FIG. 2 is block diagram illustrating an example storage processor within the data storage system shown in FIG. 1.

Further detail concerning storage processor 26(1) are discussed below in connection with FIG. 2.

Storage processor 26(1) includes controller 40, which in turn includes processor 44 and memory 46. Storage processor 32 also includes host interface 42(1), backplane interface 42(2), and array interface 42(3), (e.g., Fibre Channel or iSCSI) for communicating with hosts, other storage processors, and arrays. Host interface 42(1) interfaces to communications media such as Ethernet, Token Ring, Fibre Channel, or iSCSI, for communicating with hosts.

Processor 44 takes the form of one or more processing chips and/or assemblies. Processor 44 is coupled to memory 46 and is configured to execute instructions from code 56. Processor 44 includes cache 54 for storing log entries temporarily when, e.g., a connection to centralized log store 34 has been lost.

Memory 46 is configured to store code 56 containing instructions that, when executed by the processor 44, causes storage processor 20(1) to carry out the methods described herein of logging events in a data storage system. Code 56 includes instructions for logging server 28(1). Memory 46 includes both volatile and non-volatile memory such as random access memory, magnetic disk drives, and/or flash memory, for example.

It should be understood that storage processor 20(1) as illustrated is configured to run logging server 28(1). Other storage processors may be arranged to run logging clients or gateways instead. Further detail concerning clients and gateways are described below in connection with FIG. 3.

Figure 3:
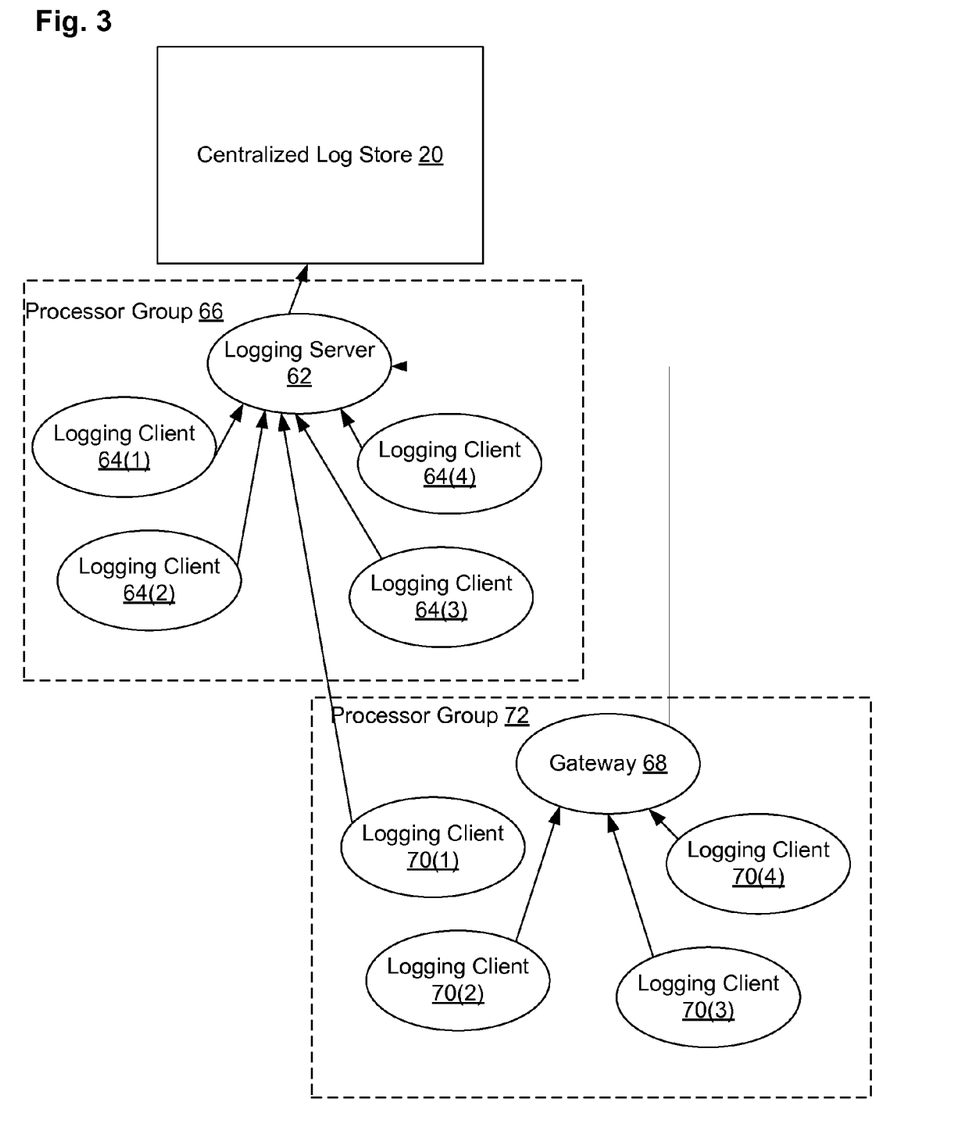
FIG. 3 is a block diagram illustrating another example data storage system in which the improved technique may be carried out.

FIG. 3 illustrates another example data storage system 60, which includes two groups of storage processors 66 and 72, as well as centralized log store 72.

As discussed previously, there is only one active server. Here, that is logging server 62 within processor group 66. Only logging server 62 has direct access to centralized log store 72 for storing log entries.

Within processor group 66, there is a set of logging clients 64 which are each configured to generate log entries upon the occurrence of an event at that logging client 64. As described above, each logging client 64 passes log entries directly to logging server 62, as illustrated by the arrows in FIG. 3.

In contrast to processor group 66 which has a logging server 62, processor group 72 has no logging server. Rather, processor group 72 contains logging clients 70 which pass log entries to gateway 68. Gateway 68 in turn passes the log entries to logging server 62. In some arrangements, however, certain logging clients of processor group 72 (e.g., logging client 70(1)) may be configured to send log entries directly to logging server 62.

Figure 4:
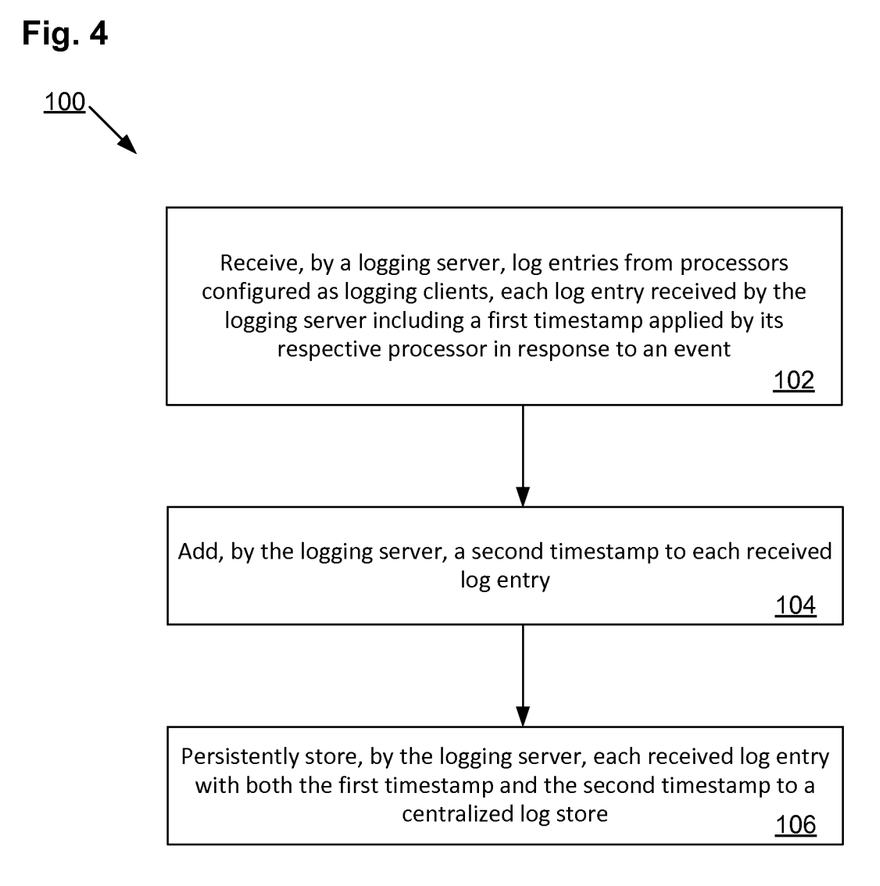
FIG. 4 is a flow chart illustrating an example method of carrying out the improved technique within the data storage system shown in FIG. 1.

FIG. 4 illustrates a method 100 of logging events in a data storage system, including steps 102, 104, and 106. In step 102, a logging server (e.g., 20(1)) is run on a storage processor of the data storage system. In step 104, log entries are received from multiple logging clients running on respective other storage processors of the data storage system, each log entry generated by one of the logging clients in response to an event occurring on the storage processor on which the logging client runs and including a first timestamp referenced to a clock on the storage processor on which the logging client runs. In step 106, the log entries including the respective first and second timestamps are persistently stored to a centralized log store.

As used throughout this document, the words "comprising," "including," and "having" are intended to set forth certain items, steps, elements, or aspects of something in in that these are provided by way of example only and the invention is not limited to these particular embodiments. In addition, the word "set" as used herein indicates one or more of something, unless a statement is made to the contrary.

Having described certain embodiments, numerous alternative embodiments or variations can be made. For example, the above discussion has dealt mainly with storage processor connected with one another over a bus. In some arrangements, however, the storage processors are arranged in an electronic network.

Also, the improvements or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like. Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Further, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not.

Those skilled in the art will therefore understand that various changes in form and detail may be made to the embodiments disclosed herein without departing from the scope of the invention.

What is claimed is:

1. A method of logging events in a data storage system, the method comprising:
   running a logging server on a storage processor of the data storage system;
   receiving, by the logging server, log entries from multiple logging clients running on respective other storage processors of the data storage system, each log entry generated by one of the logging clients in response to an event occurring on the storage processor on which the logging client runs and including a first timestamp referenced to a clock on the storage processor on which the logging client runs;
   applying, by the logging server, a second timestamp to each of the log entries received from the logging clients, each second timestamp referenced to a common clock accessible to the storage processor on which the logging server runs;
   persistently storing, by the logging server, the log entries including the respective first and second timestamps to a centralized log store;
      queuing the log entries in a cache of storage processors running the logging clients; and
      instructing the logging clients to send the queued log entries to a standby logging server, the standby logging server being configured to apply the second timestamp to received log entries and persistently store these log entries in the centralized log store.

2. A method as in claim 1,
   wherein each first timestamp is indicative of a time at which the respective event occurred;
   wherein each second timestamp is indicative of a time at which the logging server received the respective log entry, and
   wherein persistently storing each received log entry includes:
      placing the log entries into a log file stored in the centralized log store, the log entries being placed in the order in which the logging server receives the log entries.

3. A method as in claim 2, further comprising:
   resequencing the log entries in the log file based on the first timestamps and the second timestamps to place the log entries in the order in which the respective events occurred.

4. A method as in claim 2, further comprising:
   running a logging gateway on a storage processor of the data storage system, the logging gateway presenting a logging server interface to a set of the logging clients and presenting a logging client interface to the logging server;
   wherein receiving log entries from the logging clients includes:
      obtaining at least some of the log entries from the logging gateway, the logging gateway having received such log entries from at least some of the logging clients.

5. A method as in claim 4,
   wherein the log entries are generated in a first data format by application programs running on the storage processors on which the logging clients are run; and
   wherein the method further comprises:
      after receiving the log entries and prior to adding the second timestamps, translating the log entries from the first data format to a second data format.

6. A method as in claim 5,
   wherein the first data format of the log entries is a compact binary format configured to be read by an application that runs on a storage processor running a logging client; and
   wherein translating the log entries includes:
      performing an unpacking operation on one or the log entries that extracts log information in the compact binary format and writes the extracted log information to a human-readable, textual format.

7. A data storage system, comprising:
   a centralized log store; and
   multiple storage processors, including a storage processor coupled to the centralized log store, the storage processor comprising:
      a set of processing units and memory, coupled to the set of processing units, the set of processing units and the memory together realizing control circuitry, the control circuitry constructed and arranged to:
         run a logging server;
         receive, by the logging server, log entries from multiple logging clients running on respective other storage processors of the data storage system, each log entry generated by one of the logging clients in response to an event occurring on the storage processor on which the logging client runs and including a first timestamp referenced to a clock on the storage processor on which the logging client runs;
         apply, by the logging server, a second timestamp to each of the log entries received from the logging clients, each second timestamp referenced to a common clock accessible to the storage processor on which the logging server runs; and persistently store, by the logging server, the log entries including the respective first and second timestamps to the centralized log store;

queue the log entries in a cache of storage processors running the logging clients; and instruct the logging clients to send the queued log entries to a standby logging server, the standby logging server being configured to apply the second timestamp to received log entries and persistently store these log entries in the centralized log store.

8. A data storage system as in claim 7, wherein each first timestamp is indicative of a time at which the respective event occurred;

wherein each second timestamp is indicative of a time at which the logging server received the respective log entry, and wherein the controlling circuitry constructed and arranged to persistently store each received log entry is further constructed and arranged to:

place the log entries into a log file stored in the centralized log store, the log entries being placed in the order in which the logging server receives the log entries.

9. A data storage system as in claim 8, wherein the controlling circuitry is further constructed and arranged to:

sequence the log entries in the log file based on the first timestamps and the second timestamps to place the log entries in the order in which the respective events occurred.

10. A data storage system as in claim 7, further including a set of processors configured to run logging gateways, each of the logging gateways presenting a logging server interface to a set of the logging clients and presenting a logging client interface to the logging server;

wherein the controlling circuitry constructed and arranged to receive the log entry from the processors configured as logging clients is further constructed and arranged to:

obtain at least some of the log entries from the logging gateway, the logging gateway having received such log entries from at least some of the logging clients.

11. A data storage system as in claim 7, wherein the log entries are generated by application programs running on the storage processors on which the logging clients run in a first data format; and wherein the controlling circuitry is further constructed and arranged to:

after receiving the log entries and prior to adding the second timestamps, translate the log entries from the first data format to a second data format.

12. A data storage system as in claim 11, wherein the first data format of a log entry is a compact binary format configured to be read by a particular application that runs on a storage processor running a logging client; and wherein the controlling circuitry constructed and arranged to translate the log entries is further constructed and arranged to:

perform an unpacking operation on the log entry that extracts log information from the compact binary format and writes the extracted log information to a human-readable, textual format.

13. A computer program product having a non-transitory, computer-readable storage medium which stores instructions that, when executed by a controller, cause the controller to carry out a method of logging events in a data storage system, the method comprising:

running a logging server on a storage processor of the data storage system;

receiving, by the logging server, log entries from multiple logging clients running on respective other storage processors of the data storage system, each log entry generated by one of the logging clients in response to an event occurring on the storage processor on which the logging client runs and including a first timestamp referenced to a clock on the storage processor on which the logging client runs;

applying, by the logging server, a second timestamp to each of the log entries received from the logging clients, each second timestamp referenced to a common clock accessible to the storage processor on which the logging server runs;

persistently storing, by the logging server, the log entries including the respective first and second timestamps to a centralized log store;

queuing the log entries by the logging client; and instructing the logging clients to send the queued log entries to a standby logging server, the standby logging server configured to persistently store these log entries in the centralized log store.

14. A computer program product as in claim 13, wherein each first timestamp is indicative of a time at which the respective event occurred;

wherein each second timestamp is indicative of a time at which the logging server received the respective log entry, and wherein persistently storing each received log entry includes:

placing the log entries into a log file stored in the centralized log store, the log entries being placed in the order in which the logging server receives the log entries.

15. A computer program product as in claim 14, wherein the method further comprises:

sequencing the log entries in the log file based on the first timestamps and the second timestamps to place the log entries in the order in which the respective events occurred.

16. A computer program product as in claim 13, wherein the log entries are generated by application programs running on the storage processors on which the logging clients run in a first data format; and wherein the method further comprises:

after receiving the log entries and prior to adding the second timestamps, translating the log entries from the first data format to a second data format.

17. A computer program product as in claim 16, wherein the first data format of a log entry is a compact binary format configured to be read by a particular application that runs on a storage processor running a logging client; and wherein translating the log entries includes:

performing an unpacking operation on the log entry that extracts log information from the compact binary format and writes the extracted log information to a human-readable, textual format.

18. A computer program product as in claim 13, wherein the method further comprises:

running a logging gateway on a storage processor of the data storage system, the logging gateway presenting a logging server interface to a set of the logging clients and presenting a logging client interface to the logging server;

wherein receiving log entries from the logging clients includes obtaining at least some of the log entries from the logging gateway, the logging gateway having received such log entries from at least some of the logging clients, wherein the logging gateway is disposed in a storage processor separate from the storage processor on which the logging server runs.

19. A computer program produce as in claim 18, wherein each of a set of the log entries includes parameter values that pertain to a request for file data from a host computer accessing the data storage system, the parameter values including an IP (Internet Protocol) address of the host computer and a filename of a file being accessed from the data storage system by the host computer.

\* \* \* \* \*